United States Patent [19]

Cittadini

[11] Patent Number: 5,156,351
[45] Date of Patent: Oct. 20, 1992

[54] ELECTRIC FISHING REEL

[76] Inventor: Daniel Cittadini, 44 Route Nationale, Demeurs 58130 Guerigny, France

[21] Appl. No.: 833,634

[22] Filed: Feb. 7, 1992

Related U.S. Application Data

[63] Continuation of Ser. No. 491,263, Mar. 8, 1990, abandoned.

[30] Foreign Application Priority Data

Mar. 10, 1989 [FR] France .................... 89 03174

[51] Int. Cl.⁵ .......................................... A01K 89/012
[52] U.S. Cl. ............................. 242/250; 310/67 R; 310/91; 242/319
[58] Field of Search ............... 242/225, 250, 305, 319, 242/321, 323; 200/302.3, 302.2; 310/40 MM, 67 R, 88, 91

[56] References Cited

U.S. PATENT DOCUMENTS

| | | | |
|---|---|---|---|
| 3,064,385 | 11/1962 | Rickard | 242/225 X |
| 3,238,344 | 3/1966 | Miachon | 200/302.2 |
| 3,256,828 | 6/1966 | Rule | 310/91 |
| 3,275,260 | 9/1966 | Woollen | 242/305 |
| 3,561,695 | 2/1971 | Wood | 242/250 |
| 3,668,938 | 6/1972 | Dimitry . | |
| 3,898,397 | 8/1975 | Devore | 200/302.3 |
| 4,287,400 | 9/1981 | Kitik | 200/302.3 |

FOREIGN PATENT DOCUMENTS

| | | | |
|---|---|---|---|
| 1153437 | 8/1963 | Fed. Rep. of Germany . | |
| 2607667 | 6/1988 | France | 242/250 |
| 0147746 | 7/1986 | Japan | 310/88 |

Primary Examiner—Katherine Matecki
Attorney, Agent, or Firm—Marshall, O'Toole, Gerstein, Murray & Bicknell

[57] ABSTRACT

An electric fishing reel is disclosed, comprising a case whose wall has at least one opening through which passes a mechanical connection connecting at least one controlled member and one control member together, disposed respectively on each side of said wall, sealing means being provided for sealing the passage of said mechanical connection through said opening.

According to the invention said sealing means are formed by a piece of resilient deformable material providing at least a spring function for said mechanical connection.

3 Claims, 2 Drawing Sheets

ELECTRIC FISHING REEL

This application is a continuation of application Ser. No. 07/491,263, filed Mar. 8, 1990, now abandoned.

BACKGROUND OF THE INVENTION

From the patents FR-A-1 518 684, FR-A-2 052 065 and FR-A-2 607 667 for example electric fishing reels are known comprising a case containing a controlled member, such as a switch or a motor, the wall of said case being provided with an opening for passing a mechanical control connection therethrough, which connects said internal controlled member to a control member external to said case and which is carried thereby.

Of course, since the use of such a reel takes place in the immediate vicinity of water, it is indispensable for said mechanical control connection to be sealed.

The object of the invention is precisely to provide such mechanical connections which are perfectly sealed.

SUMMARY OF THE INVENTION

To this end, in accordance with the invention, the electric fishing reel, comprising a case whose wall has at least one opening through which passes a mechanical connection connecting at least one controlled member and one control member together, disposed respectively on each side of said wall, sealing means being provided for sealing the passage of said mechanical connection through said opening, is remarkable in that said sealing means are formed by a piece of resiliently deformable material providing at least a spring function for said mechanical connection.

Thus, since said mechanical piece provides simultaneously the functions of sealing and resilience for the mechanical connection, it is possible to obtain transmissions of simple and perfectly sealed structure.

Preferably, said piece of resiliently deformable material is made from a polyurethane or similar material, able to provide good sealing while having good resilient deformation properties.

In a first embodiment, said mechanical connection may comprise a rigid pin and the piece of resiliently deformable material may be a ring through which said pin passes sealingly, which pin is able to pivot transversely to its length against the resilient action of said ring. Thus, said rigid pin may be controlled voluntarily (by pushing or pulling) by one of its ends, the other end being pivoted accordingly while compressing the ring. This latter end may then control any desirable member, for example a switch. When the pin is released, it comes back to its initial position, under the action of the ring which is decompressed.

In a variant, said piece may be a block passing through said opening and forming a projection on one side of the wall, voluntary deformation of said piece by acting on the projection being transferred to a portion of said block disposed on the other side of said wall.

Such an embodiment is particularly interesting for then said piece forms said mechanical connection and simultaneously provides the sealing and movement transmission functions.

Preferably, in order to increase the transmission property of a thrust or pull applied to the projection of said piece, said projection is fast with the central portion of said block and this central portion is partially separated from the periphery thereof for increasing its mobility and so the transmission of action on said projection. Thus the sealing function reserved for the periphery of the piece is decoupled from the control function which is reserved for the central portion thereof.

In the case where, as in patent FR-A-2 607 667, an electric motor is provided disposed in said case for driving a rotary drum, the transmission of the rotational movements between the shaft of the motor and said drum being obtained by a roller external to the case and bearing against a rim of said drum, it is particularly advantageous in accordance with the invention for the pressure of said roller against said rim to be due to the action of the piece of resiliently deformable material, which in addition provides sealing at the level of the opening in the case through which said motor shaft passes.

Said piece may then be in the form of an envelope having the exact shape of the motor which it surrounds intimately and closes said opening by one of its faces, said face having said shaft of the motor passing sealingly therethrough and said envelope is pre-stressed so as to press the roller against the rim.

In the case where said piece of resiliently deformable material is housed at least partially in said opening, it is advantageous for it to comprise shoulders pressed respectively resiliently against the opposite faces of the wall of said case, at the periphery of said opening.

BRIEF DESCRIPTION OF THE DRAWINGS

The figures of the accompanying drawings will better show how the invention may be implemented. In these figures, identical references designate similar elements.

DESCRIPTION OF THE PREFERRED EMBODIMENTS

Figure 1:
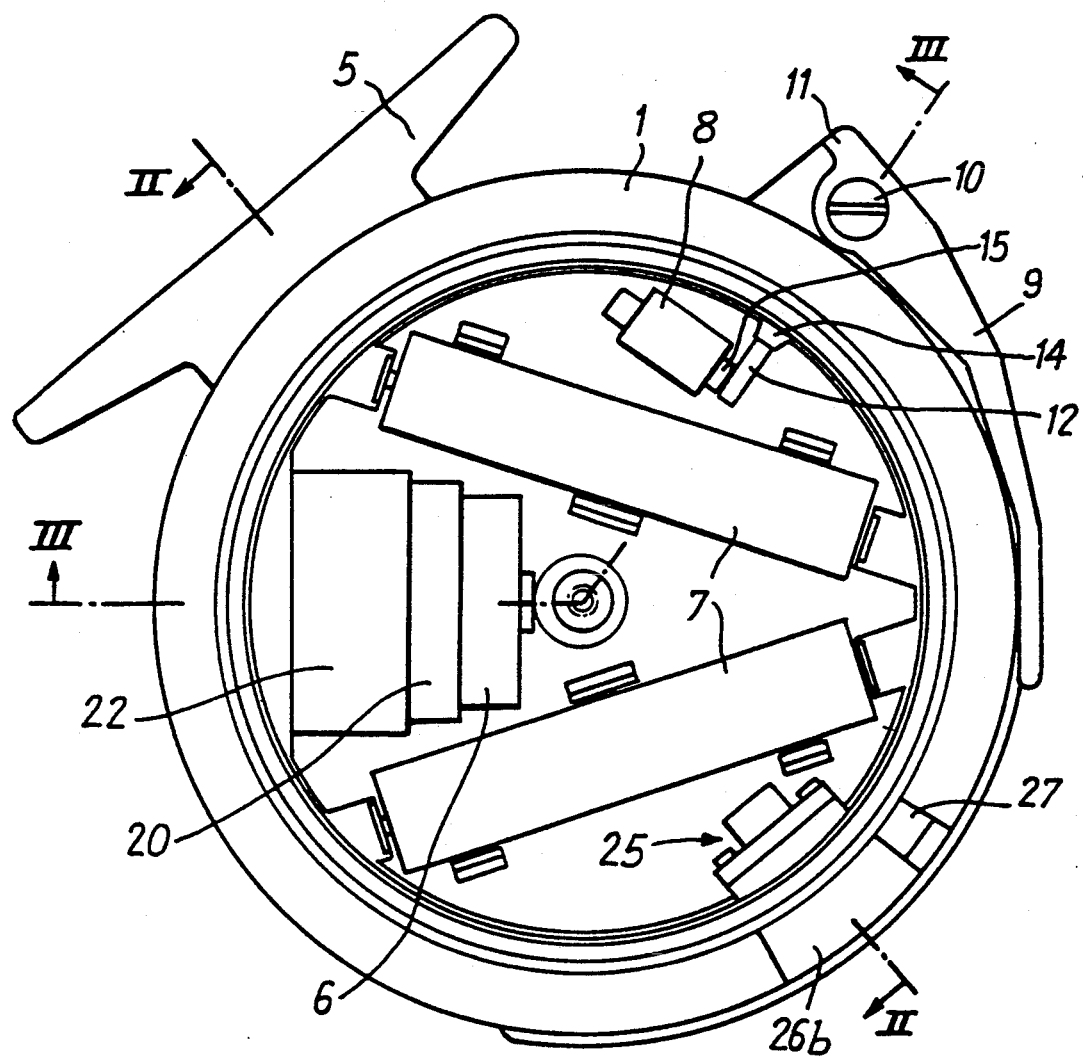
FIG. 1 is an elevational view of one embodiment of the reel according to the invention, the lid of the case being removed so as to show the inside thereof, which is shown only partially.

The reel embodiment according to the invention, shown schematically in the figures, comprises a case 1 which is sealingly closed by a lid 2 and a drum 3 rotatable about a bearing 4 fast with said case 1, on the side opposite lid 2, said rum 3 being external to said case.

A foot 5, fixed to case 1, is provided for fixing the reel on a fishing rod.

Inside case 1 is provided an electric motor 6 as well as batteries 7 for said motor. A switch 8, inside the case 1, controls the power delivered by the batteries 7 to the electric motor 6 under the control of a rotary lever 9 which may rotate about a pin 10 fixed to the case. The rotary lever 9 comprises a projection 11 which can come into contact with a pin 12 passing through the wall of case 1 through an opening 13. This opening 13 is closed by a polyurethane ring 14 providing sealing at the level of opening 13, said ring itself having said pin 12 passing sealingly therethrough. As shown, the ring preferably comprises shoulders which are applied against the two opposite faces of the wall of case 1, at the periphery of opening 13.

Thus, it can be seen that when lever 9 rotates about pin 10, projection 11 of lever 9 arrives in contact with the external end of pin 12 and the latter is pivoted transversely to its length through the resilient transverse deformation of said ring 14. The inner end of said pin 12 may then act on the mobile member 15 of switch 8, while moving substantially orthogonally to its length.

Furthermore, shaft 16 of the electric motor 6 passes through case 1 through a slit 17. At its external end, it is provided with a drive roller 18, capable of rolling on a rim 19 of drum 3.

A polyurethane envelope 20 intimately surrounds motor 6 and closes slit 17. Shaft 16 of motor 6 passes sealingly through said envelope, through lips 21. The motor 6 is secured to case 1 by a collar 22 which prestresses said envelope 20, so that roller 18 is pressed resiliently against rim 19.

Thus, when lever 9 is rotated about pin 10, projection 11 causes pin 12 to pivot, against the action of the resilient ring 14 so that switch 8 is actuated. The motor 6 is then supplied with power and roller 18 causes rotation of drum 3. If lever 9 is brought back in the opposite direction, the power supply for the motor ceases as soon as the ring 14, resuming its initial shape, brings pin 12 back to its unpivoted position.

Thus it can be seen that both ring 14 and envelope 20 provide at one and the same time a sealing function and a resilient function, with pin 12 and shaft 21, respectively.

Figure 2:
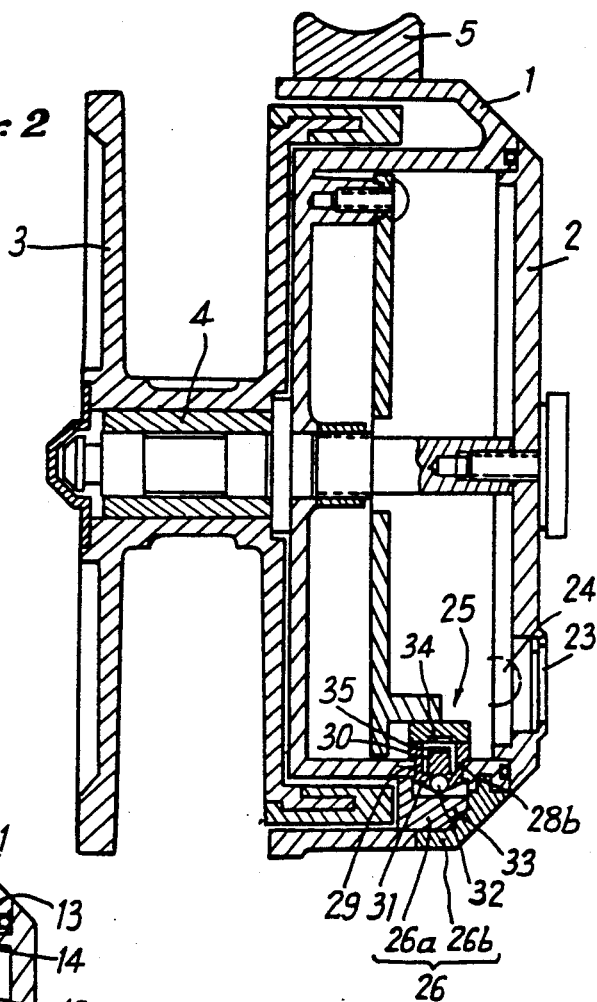
FIGS. 2 and 3 are respectively sections through lines II—II and III—III of FIG. 1, the inside of the case being shown partially.
Figure 3:
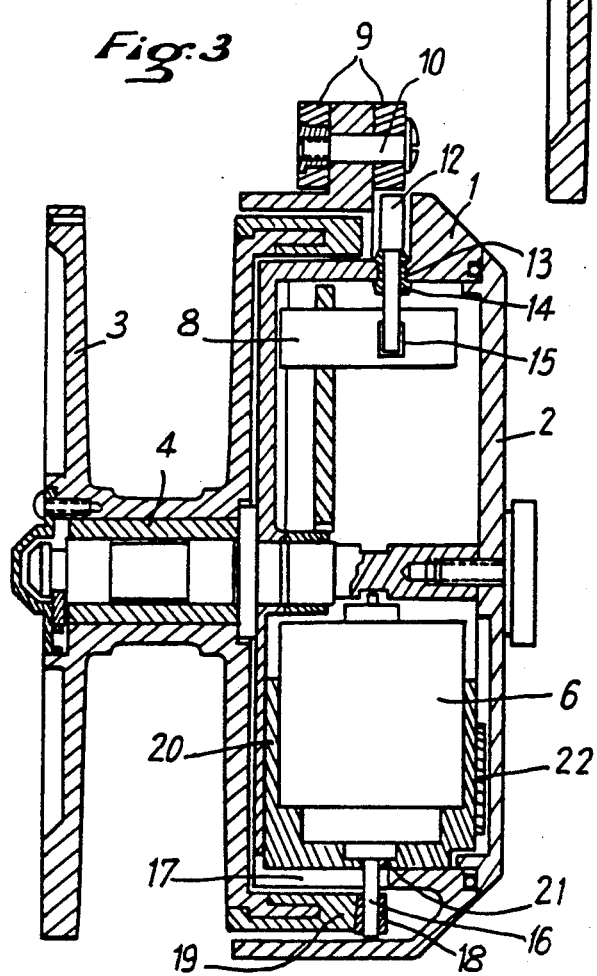

Furthermore, as shown in FIG. 2, the lid 2 of case 1 comprises a transparent window 23 behind which is disposed an electric lamp 24 (shown schematically and partially) which can be fed from batteries 7 through a switch 25 for serving as lighting device.

Figure 4:
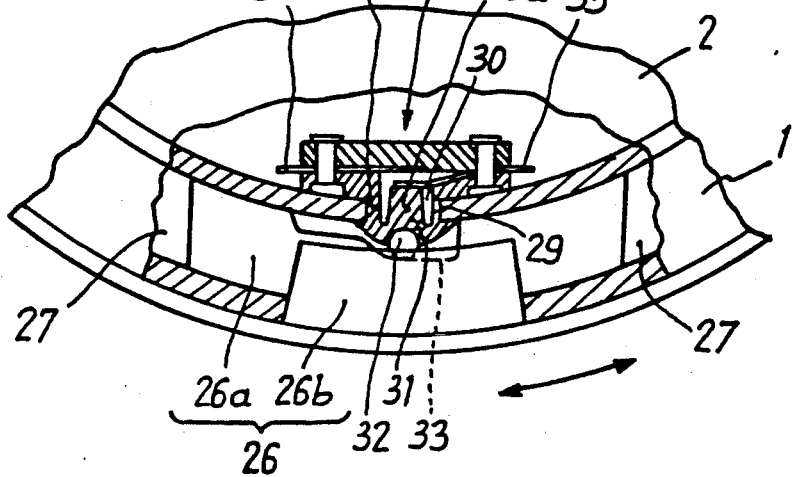
FIG. 4 is a view, with parts cut away, of a portion of the reel of FIG. 1, opposite the foot thereof, illustrating a slide switch.

As also shown in FIG. 4, switch 25 is formed by a slide 26 (in two parts 26a and 26b) movable tangentially to case 1, in a peripheral housing 27 thereof, as well as by a block 28 of resiliently deformable material which sealingly closes an opening 29 in the wall of said case. The central portion 28a of said block 28 is separated partially from the peripheral portion 28b thereof by slits 30, providing greater mobility for said central portion 28a. In addition, the central portion 28a of block 28 comprises a projection 31 carrying a ball or similar 32, in contact with a ramp 33 of slide 26.

Thus, the peripheral portion 28b of block 28 provides sealing at the level of opening 29, whereas the central portion 28a is sufficiently mobile to cause closure of the contact between two terminals 34 and 35, connected to batteries 7, when it is pushed back by the ramp 33 of slide 26, which is moved for this purpose (from left to right in FIG. 4). Lamp 24 then lights up. If slide 26 is brought back to its initial position (by movement form right to left in FIG. 4), the resilience of block 28 forces ball 32 to follow ramp 33 and terminals 34 and 35 separate under the action of this resilience.

In this case, block 28 provides both sealing and mechanical connection between the inside and the outside of the case.

Here again, shoulders are provided on block 28 for bearing on the opposite faces of the wall of case 1, at the periphery of opening 29.

What is claimed is:

1. An electric fishing reel comprising a case including a wall having opposite faces, said wall being provided with at least one opening having a periphery;
    a drum rotatably mounted on said case and having a rim;
    an electric motor disposed in said case, said motor having a rotatably driven shaft for driving said rotatable drum;
    said shaft passing through said opening, and a roller mounted on said shaft outside said case and bearing against said rim;
    an envelope of resiliently deformable material at least partially enclosing said motor in the region of said opening, said envelope providing a seal between said shaft and said case wall, and
    a collar securing said motor to said case at a position where the collar prestresses said envelope in a direction to bias said roller against said rim, whereby rotary motion of said shaft is imparted to said drum.

2. The reel as claimed in claim 1, wherein said envelope is made from polyurethane.

3. The reel as claimed in claim 1, wherein said envelope has the exact shape of the motor which it surrounds intimately, and closes said opening by a face thereof through which said shaft of the motor passes sealingly.

* * * * *